(12) United States Patent
Deprez et al.

(10) Patent No.: US 11,520,879 B2
(45) Date of Patent: Dec. 6, 2022

(54) TRUSTED EXECUTION ENVIRONMENT MIGRATION METHOD

(71) Applicant: TRUSTONIC LIMITED, Cambridge (GB)

(72) Inventors: Olivier Deprez, Valbonne (FR); Lukas Hänel, Valbonne (FR)

(73) Assignee: Trustonic Limited, Cambridge (GB)

( * ) Notice: Subject to any disclaimer, the term of this patent is extended or adjusted under 35 U.S.C. 154(b) by 525 days.

(21) Appl. No.: 16/738,011

(22) Filed: Jan. 9, 2020

(65) Prior Publication Data
US 2020/0311256 A1    Oct. 1, 2020

(30) Foreign Application Priority Data
Mar. 25, 2019    (GB) ...................................... 1904088

(51) Int. Cl.
| | |
|---|---|
| *G06F 21/53* | (2013.01) |
| *G06F 9/48* | (2006.01) |
| *G06F 12/0806* | (2016.01) |
| *G06F 21/57* | (2013.01) |
| *G06F 21/74* | (2013.01) |
| *G06F 9/52* | (2006.01) |

(52) U.S. Cl.
CPC ............ *G06F 21/53* (2013.01); *G06F 9/4812* (2013.01); *G06F 9/4875* (2013.01); *G06F 9/52* (2013.01); *G06F 12/0806* (2013.01); *G06F 21/57* (2013.01); *G06F 21/74* (2013.01); *G06F 2221/2149* (2013.01)

(58) Field of Classification Search
CPC ...... G06F 21/53; G06F 9/4812; G06F 9/4875; G06F 9/52; G06F 12/0806; G06F 21/57; G06F 21/74; G06F 2221/2149
See application file for complete search history.

(56) References Cited

U.S. PATENT DOCUMENTS

| | | | |
|---|---|---|---|
| 9,697,124 B2* | 7/2017 | Park ....................... | G06F 9/5016 |
| 2015/0278514 A1 | 10/2015 | Kang et al. | |

(Continued)

OTHER PUBLICATIONS

Combined Search and Examination Report for GB Application No. 1904088.0 dated Sep. 27, 2019, 6 pages.

*Primary Examiner* — Henry Tsang
*Assistant Examiner* — Suman Debnath
(74) *Attorney, Agent, or Firm* — Nixon & Vanderhye P.C.

(57) ABSTRACT

A trusted execution environment migration method for a device comprising a multicore processor, the processor operable to execute a rich execution environment (REE) and a trusted execution environment (TEE), the method comprising: executing a TEE scheduler in the REE on a first core of the multicore processor; subsequent to a migration of the TEE scheduler from the first core to a second core, issuing a request, by the TEE scheduler and to a transition submodule in the TEE, to execute an operations submodule in the TEE, wherein the transition submodule is operable to manage the transition of a core of the processor between execution of the REE and execution of the operations submodule in the TEE, and wherein the transition submodule is executed on the same core as the TEE scheduler; upon execution of the operations submodule, determining if the core on which the operations submodule is executing has changed since the previous execution of the operations submodule.

16 Claims, 7 Drawing Sheets

(56) References Cited

U.S. PATENT DOCUMENTS

2017/0054557 A1* 2/2017 Rozas .................. H04L 63/10
2020/0004953 A1* 1/2020 Lemay ................. G06F 21/53
2021/0103470 A1* 4/2021 Yao .................... G06F 21/74

* cited by examiner

TRUSTED EXECUTION ENVIRONMENT MIGRATION METHOD

This application claims priority to GB Application No. 1904088.0 filed Mar. 25, 2019, the entire contents of which are hereby incorporated by reference.

FIELD AND BACKGROUND

The present techniques relate to the field of electronic devices. More particularly, they relate to methods for migrating a Trusted Execution Environment between cores on a multicore processor.

Increasingly, electronic devices are being used to access services which may involve handling of potentially sensitive information, such as mobile banking, access to health care services or handling of employment details. Also, with the increasing development of the Internet of Things (IoT), it is becoming more common for systems such as heating, air-conditioning or street lighting to be controlled based on information provided by electronic devices which may provide sensor information such as temperature data or proximity information indicating whether a user is present, for example. In these scenarios, it is important to ensure the security of sensitive information.

One approach that has been developed in recent years is the use of Trusted Execution Environments (TEEs) which act as a secure area of a processor in which to execute sensitive applications and processes. The TEE is isolated from a Rich Execution Environment (REE) in which a rich-OS such as Android, iOS, Windows or Linux can be executed. Examples of embedded hardware technologies which can be used to support TEE implementations include Arm®'s TrustZone®, AMD's Secure Processor and Intel's Trusted Execution Technology.

In general, on a multicore processor, the TEE is executed as a single execution thread on a single core of the multicore processor at a time. This helps maintain data consistency across the various TEE applications and processes which can help avoid concurrency and security issues.

In certain prior approaches this is achieved through the TEE being "pinned" to a single "active" core such that the TEE can only be entered on the active core. However, in some cases it is desirable for the core on which the TEE is executed to be changed, for example, to allow a core to enter a low power state, for example, a sleep state. One challenge, however, with migrating the active core is that there are multiple routes by which the TEE can be entered. Beyond scheduled entries to the TEE, the TEE can be entered, for example, in response to a secure interrupt which requests execution of code within the TEE. These interrupts, can in principle be originated from any core from either the REE or TEE.

Accordingly, there is a need to ensure that upon change of the active core that all possible entry points to the TEE are retargeted to correctly target the new active core. This can be challenging as, by definition, communications between the TEE and REE are highly-controlled and the two execution environments require a way to agree on core numbering. In certain prior approaches this has been achieved through a dedicated "core migration" synchronization API which utilizes both TEE and REE components together with a processor core id conversion table. Upon an instruction to migrate the active core, the core migration synchronization API is explicitly invoked which, in conjunction with the processor core id conversion table, retargets all the possible entry points to the new active core.

However, as identified by the inventors of the present application, these prior approaches have a number of drawbacks. For example, these approaches in practice require adaptation of the core migration synchronization API and processor core id conversion table to each new multicore processor and hardware environment as there is considerable variation in how the different cores are identified across processors and environments.

In addition, as identified by the present inventors, the requirement to explicitly invoke the core migration synchronization API limits the ability of a rich-OS scheduler operating in the REE to dynamically reassign the core on which the TEE is executed. As such, prior approaches are unable to effectively dynamically adjust to rapidly varying changes in resource demand of the TEE, for example, as encountered when utilizing a Trusted User Interface.

At least certain embodiments of the present disclosure address one or more of these problems as set out above.

SUMMARY

Particular aspects and embodiments are set out in the appended claims.

Viewed form one perspective there can be provided a trusted execution environment migration method for a device comprising a multicore processor, the processor operable to execute a rich execution environment (REE) and a trusted execution environment (TEE), the method comprising: executing a TEE scheduler in the REE on a first core of the multicore processor; subsequent to a migration of the TEE scheduler from the first core to a second core, issuing a request, by the TEE scheduler and to a transition submodule in the TEE, to execute an operations submodule in the TEE, wherein the transition submodule is operable to manage the transition of a core of the processor between execution of the REE and execution of the operations submodule in the TEE, and wherein the transition submodule is executed on the same core as the TEE scheduler; upon execution of the operations submodule, determining if the core on which the operations submodule is executing has changed since the previous execution of the operations submodule.

By keeping track of which core the operations submodule (which executes within the TEE) is executing on, and determining if a change in core has been made since the previous execution of the operations submodule, a determination can be made from within the TEE itself if the core on which the TEE is executing has been migrated without the TEE needing to be informed by an REE component or API that the core has been migrated. This avoids the need for a processor core id conversion table since the new core can be directly identified from within the TEE using the TEE's own identification scheme for processor cores. In some examples, the determination is made by the operations submodule executing in the TEE. In other examples, the determination is made by the transition submodule executing in the TEE.

Since there is no need to inform the TEE that it is about to be, or has been migrated, the TEE can be dynamically migrated between cores, for example, in response to changes in resource consumption of REE and TEE threads. In other words, there is no longer a need to "pin" the execution of the TEE to an "active" core.

Furthermore, maintainability and scalability are improved since there is no longer a need to adapt a "core migration" synchronization API and a processor core id conversion table for each new processor and hardware environment.

It is noted that since the TEE scheduler (which executes in the REE) is executed on the same core as the transition submodule (which executes in the TEE), a migration of the TEE scheduler from a first core to a second core will also result in the migration of the core which the transition submodule executes upon. It is also noted that while, in some examples, the TEE scheduler may issue its request to the transition submodule directly following the migration of the TEE scheduler, in other examples the request may follow some time later.

In some examples, the operations submodule is executed on the same core as the transition submodule such that both the operations submodule and transition submodule execute on the same core. In other examples, the operations submodule is executed on a different core from the transition submodule to be determined by the transition submodule.

In some terminologies (e.g. Arm® TrustZone®), the TEE can be thought of as a "Secure World" and the REE can be thought of as a "Normal World". The TEE is operable to execute one or more trusted software components, for example the transition submodule and the operations submodule.

The transition submodule can be thought of as the software component which is operable to manage the transition of a core of the processor between execution of the REE and execution of the operations submodule in the TEE. In some examples, the transition submodule can include a secure monitor and the request by the TEE scheduler executing in the REE to the transition submodule in the TEE is a secure monitor call. The operations submodule can be thought of as the software component which actually processes requests, for example, by executing one or more trusted applications. The TEE scheduler can be thought of, for example, as the REE component that schedules "regular" TEE operations.

In some examples, if the core on which the operations submodule is executing has changed, one or more secure interrupts are retargeted to target the current core on which the operations submodule is executing. Thereby, secure interrupts (e.g. interrupts which request execution of code or processing of data within the TEE) can be "lazily" retargeted upon detection of a migration of the core on which the operations submodule of the TEE is executing. As described above, this is achieved without the need for a REE component (e.g. an API or REE driver) to signal to a TEE component/submodule that the core on which the TEE is executed has been migrated. This means that if some component of the REE wishes to migrate the core on which the TEE is being executed, it is free to do so without a need to explicitly inform the TEE and without the need to wait for a migration process to be executed.

In some examples, if the core on which the operations submodule is executing has changed, all programmed secure interrupts are retargeted to target the current core on which the operations submodule is executing. Thereby, secure interrupts (e.g. interrupts which request execution of code or processing of data within the TEE) can be "lazily" retargeted upon detection of a migration of the core on which the operations submodule of the TEE is executing. As described above, this is achieved without the need for a REE component (e.g. an API or REE driver) to signal that the core on which TEE is executed has been migrated. This means that if some component of the REE wishes to migrate the core on which the TEE is being executed it is free to do so without a need to explicitly inform the TEE and without the need to wait for a migration process to be executed. It is furthermore noted, that by retargeting all programmed secure interrupts, the triggering of any secure interrupt will result in the up to date targeting of the current core for TEE execution. In some examples, there may be no programmed secure interrupts and accordingly no secure interrupts need be retargeted.

In some examples, the multicore processor is a heterogeneous multicore processor where at least one of the cores of the heterogeneous multicore processor has different performance characteristics to another one of the cores of the heterogeneous multicore processor. In some examples, certain cores are power efficient and have a relatively low computational performance whereas other cores are power-hungry but have relatively high computational performance. An example of such a suitable architecture is Arm® big.LITTLE™. Another example of such a suitable architecture is Arm® DynamIQ™. Having cores with heterogeneous performance allows for threads (including the thread(s) which execute the TEE) to be allocated to cores appropriate for their computing needs. For example, threads which only need low computational performance can be migrated to a power efficient core which may in turn allow a power-hungry core to be placed in a low power state hence reducing energy consumption. Conversely, if a thread requires a high computational performance it can be migrated to a high computational performance core thus allowing the thread to execute in a timely manner.

In some examples, the TEE scheduler is migrated from the first core to the second core by a rich-OS scheduler executing in the REE. As described above, the approach developed by the present inventors allows the regular rich-OS scheduler to migrate the TEE scheduler in the same manner as any thread since, for example, the TEE scheduler is no longer pinned to an active core designated for TEE operations. Modern rich-OS (e.g. Android, iOS, Windows or Linux) schedulers have a wide range or optimizations (e.g. load balancing, spatial and temporal thread allocation, gang scheduling) which can improve the performance and/or power consumption of the device on which they are executing. Accordingly, by providing an approach that allows for the TEE scheduler to be treated in the same manner as any other thread, the TEE scheduler can benefit from the same optimizations provided by the rich-OS scheduler to "regular" REE threads. The present approach allows the rich-OS scheduler to operate without particular knowledge of the existence of the TEE.

In some examples, the rich-OS scheduler collects thread statistics on the execution of the TEE scheduler, wherein the operations submodule is executed on the same core that is executing the TEE scheduler, and wherein the execution of the operations submodule is transparently extended through the TEE scheduler so that execution of the operations submodule appears to be part of the TEE scheduler to the rich-OS scheduler and execution of the operations submodule is accounted for in the thread statistics of the execution of the TEE scheduler.

Thereby, by transparently extending the execution of the operations submodule through the TEE scheduler, the execution resources (e.g. processing time, memory consumption etc.) utilized by the operations submodule "looks" to the rich-OS scheduler to be part of the TEE scheduler. Further, since the operations submodule is executed on the same core as the TEE scheduler, any changes to the performance of the core that the TEE scheduler is operating on made by the rich-OS scheduler will also affect the operations submodule. Accordingly, for example, a spike in resources utilized by the operations submodule will be "noticed" by the rich-OS scheduler as a spike in the resources utilized by the TEE scheduler and in response the rich-OS scheduler may improve the performance of the core on which the TEE scheduler/operations submodule is operating on, hence improving the performance of the operations submodule even though the rich-OS scheduler need not be aware of the operations submodule's existence.

In some examples, in response to the rich-OS scheduler determining, using the thread statistics, that the TEE scheduler is utilizing a low or a high proportion of the resources of the core it is executing on, the rich-OS scheduler decreases or increases the voltage and/or frequency of the core the TEE scheduler is executing on respectively. Increasing the voltage and/or frequency of a core increases the computational performance, and energy consumption, of that core. Thereby, for example, when the thread statistics indicate that the TEE scheduler is utilizing a high proportion of the resources of the core it is executing on (which may result from high resource utilization of the operations submodule which is included in the TEE scheduler's statistics) the rich-OS scheduler is able to dynamically increase the computational performance of the core that the TEE scheduler (and operations submodule) is operating on. Conversely, in the case of low resource consumption the core's computational performance may be reduced, for example, to reduce power consumption. The rich-OS scheduler is able to make such dynamic performance adjustments due to the above-described manner of accounting for the operations submodule resource consumption within the thread statistics for the TEE scheduler. In some examples, the range of available voltage and/or frequencies for each core may be dependent, at least in part, on the power, voltage and frequency status of other cores. This may, for example, be due to overall power restrictions on the multicore processor. Accordingly, in some examples the rich-OS scheduler may decrease the voltage and/or frequency of one core to increase the voltage and/or frequency, and hence performance, of another core. Similarly, the rich-OS scheduler may power down some cores to allow others to be run at higher performance.

In some examples, the multicore processor is a heterogeneous multicore processor where at least one of the cores of the heterogeneous multicore processor has different performance characteristics to another one of the cores of the heterogeneous multicore processor, wherein in response to the rich-OS scheduler determining, using the thread statistics, that the TEE scheduler is utilizing a low or high proportion of the resources of the core it is executing on, the rich-OS scheduler migrates the TEE scheduler to a lower or higher performance core respectively. Thereby, for example, when the thread statistics indicate that the TEE scheduler is utilizing a high proportion of the resources of the core it is executing on (which may result from high resource utilization of the operations submodule which is included in the TEE scheduler's statistics) the rich-OS scheduler is able to dynamically migrate the TEE scheduler (and accordingly the operations submodule which in the present example is executed on the same core as the TEE scheduler) to a higher performance core. Conversely, in the case of low resource consumption the TEE scheduler (and accordingly the operations submodule) can be moved to a lower performance core, which may for example allow the rich-OS scheduler to power down one of the higher performance cores or free up computing time to migrate some other process to one of the higher performance cores. The rich-OS scheduler is able to make such dynamic performance adjustments due to the above-described manner of accounting for the operations submodule resource consumption within the thread statistics for the TEE scheduler.

In some examples, when a request by the TEE scheduler to execute the operations submodule is issued to the transition submodule, the transition submodule attempts to acquire a global TEE lock, if the global TEE lock is not already held then the attempt to acquire the global TEE lock is successful, the request is processed in the operations submodule and the global TEE lock is released once the request has been processed, if the global TEE lock is already held then the attempt to acquire the global TEE lock is unsuccessful and the request to execute the operations submodule is delayed until the global TEE lock can be acquired.

Thereby, by requiring a global TEE lock to be obtained before the request is processed, the method ensures that requests are "serialised" such that only one request is actively processed at a time in the operations submodule. This avoids the issue where there is a first request on one core (e.g. the TEE scheduler executing in the REE issuing a request to the transition submodule) and a second request on another core (e.g. a secure interrupt on the another core when the another core is executing in the REE) thus avoiding the potential concurrency issues which could result the two requests simultaneously executing which could lead to various data inconsistency, security and race condition issues. In some examples, the delay is implemented through the transition submodule entering a loop where it periodically attempts to acquire a global TEE lock.

In some examples, when a secure interrupt request is triggered while the core on which the secure interrupt request is triggered is executing in the REE, the transition submodule attempts to acquire a global TEE lock, if the global TEE lock is not already held then the attempt to acquire the global TEE lock is successful, the secure interrupt request is processed in the operations submodule and the global TEE lock is released once the secure interrupt request has been processed, if the global TEE lock is already held then the attempt to acquire the global TEE lock is unsuccessful and the secure interrupt request is delayed until the global TEE lock can be acquired.

Thereby, by requiring a global TEE lock to be obtained before the request is processed, the method ensures that requests are "serialised" such that only one request is actively processed at a time in the operations submodule. This avoids the issue where there is a first request on one core (e.g. the TEE scheduler executing in the REE issuing a request to the transition submodule) and a second request on another core (e.g. a secure interrupt on the another core when the another core is executing in the REE) thus avoiding the potential concurrency issues which could result the two requests simultaneously executing which could lead to various data inconsistency, security and race condition issues. In some examples, the delay is implemented through the transition submodule entering a loop where it periodically attempts to acquire a global TEE lock.

In some examples, when a secure interrupt request is triggered while the core on which the secure interrupt request is triggered is executing in the TEE, the secure interrupt request is immediately processed in the operations submodule. Thereby, the secure interrupt request can be immediately processed thus reducing delays in handling the secure interrupt request. This can be of particular importance as secure interrupt requests can be of an urgent and high-priority nature.

In some examples, the TEE utilizes a microkernel. Thereby, delays in processing requests (e.g. secure interrupts) can be minimised. For example, when a plurality of requests are serialised the microkernel can ensure that secure interrupts are handled with minimal delays.

In some examples, the multicore processor includes one or more caches for caching recent data or instructions. Thereby, recently accessed data or instructions can probabilistically (i.e. when previously stored in the cache) be more rapidly retrieved. As described above, in various examples the described methods ensure that, other than immediately subsequent to a core migration, all secure interrupt requests will be targeted to the same core as the TEE Scheduler and operations submodule which thereby localizes the regular secure world services execution (i.e. through the TEE scheduler) and the secure interrupt handling on the same core as much as possible. Consequently, this permits maximization of TEE cache hits.

In some examples, the operations submodule executes a trusted user interface and wherein one or more of the secure interrupts delivers user input to the trusted user interface. In some examples, a trusted user interface (TUI) is an interface that allows trusted applications operating in the TEE to securely receive inputs and send outputs from hardware I/O devices bypassing the rich-OS. The trusted application, in some examples, communicates with the I/O devices using trusted drivers which operate in the TEE. TUI can have a greatly fluctuating level of resource utilization since, by definition, its resource utilization is dependent upon, among other things, the absence or presence of user input, where the presence of user input may cause a spike in resources utilization.

In addition, during periods of high output, for example, large areas of a display device being redrawn, there may also be a spike in resource utilization. In some examples, output devices may also generate secure interrupts, for example, a Vsync notification from an output display device. Accordingly, TUI may in particular benefit from present techniques where the rich-OS scheduler is able to dynamically increase and decrease the performance of a core on which the TUI is run both in terms of improved performance and reduced energy consumption. Examples of I/O devices which may issue secure interrupts to the trusted user interface include: mouse, touch screen, keyboard, microphone, fingerprint reader, camera, accelerometer, GPS, screen, monitor, speaker, haptic device, printer or any other suitable I/O device.

Viewed from one perspective, there can be provided a computer program for controlling a device to perform any of the above-described methods. In some examples, the computer program is stored on a storage medium.

Viewed from one perspective, there can be provided a device comprising: a multicore processor operable to execute a rich execution environment (REE) and a trusted execution environment (TEE); data storage storing at least one computer program for controlling the processing circuitry to perform any of the above-described methods.

Other aspects will also become apparent upon review of the present disclosure, in particular upon review of the Brief Description of the Drawings, Detailed Description and Claims sections.

BRIEF DESCRIPTION OF THE DRAWINGS

Examples of the disclosure will now be described, by way of example only, with reference to the accompanying drawings in which.

Figure 1A:
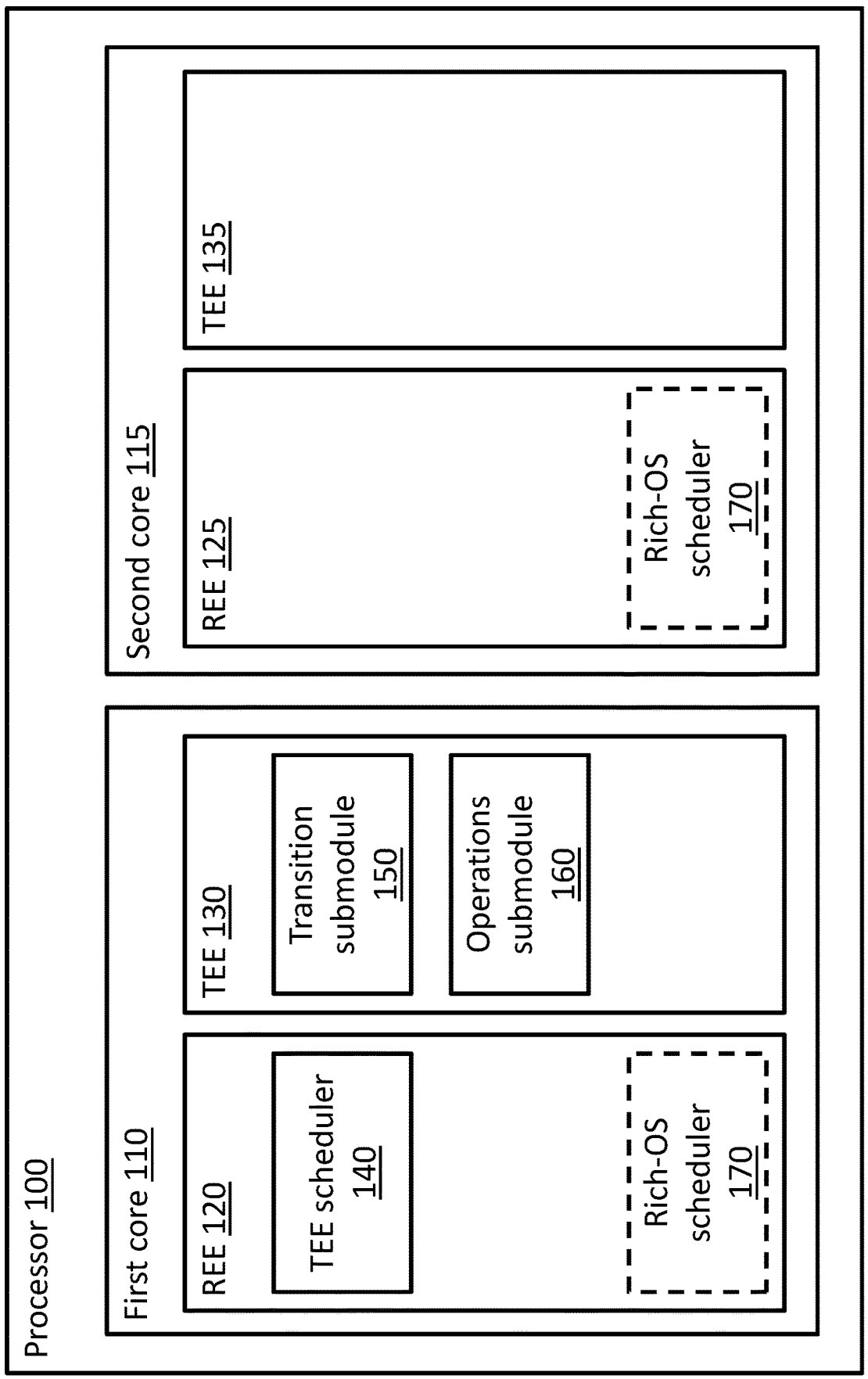
FIG. 1A schematically illustrates a multicore processor configured to operate before migration.

While the disclosure is susceptible to various modifications and alternative forms, specific example approaches are shown by way of example in the drawings and are herein described in detail. It should be understood however that the drawings and detailed description attached hereto are not intended to limit the disclosure to the particular form disclosed but rather the disclosure is to cover all modifications, equivalents and alternatives falling within the spirit and scope of the claimed invention.

It will be recognised that the features of the above-described examples of the disclosure can conveniently and interchangeably be used in any suitable combination.

DETAILED DESCRIPTION

Figure 1B:
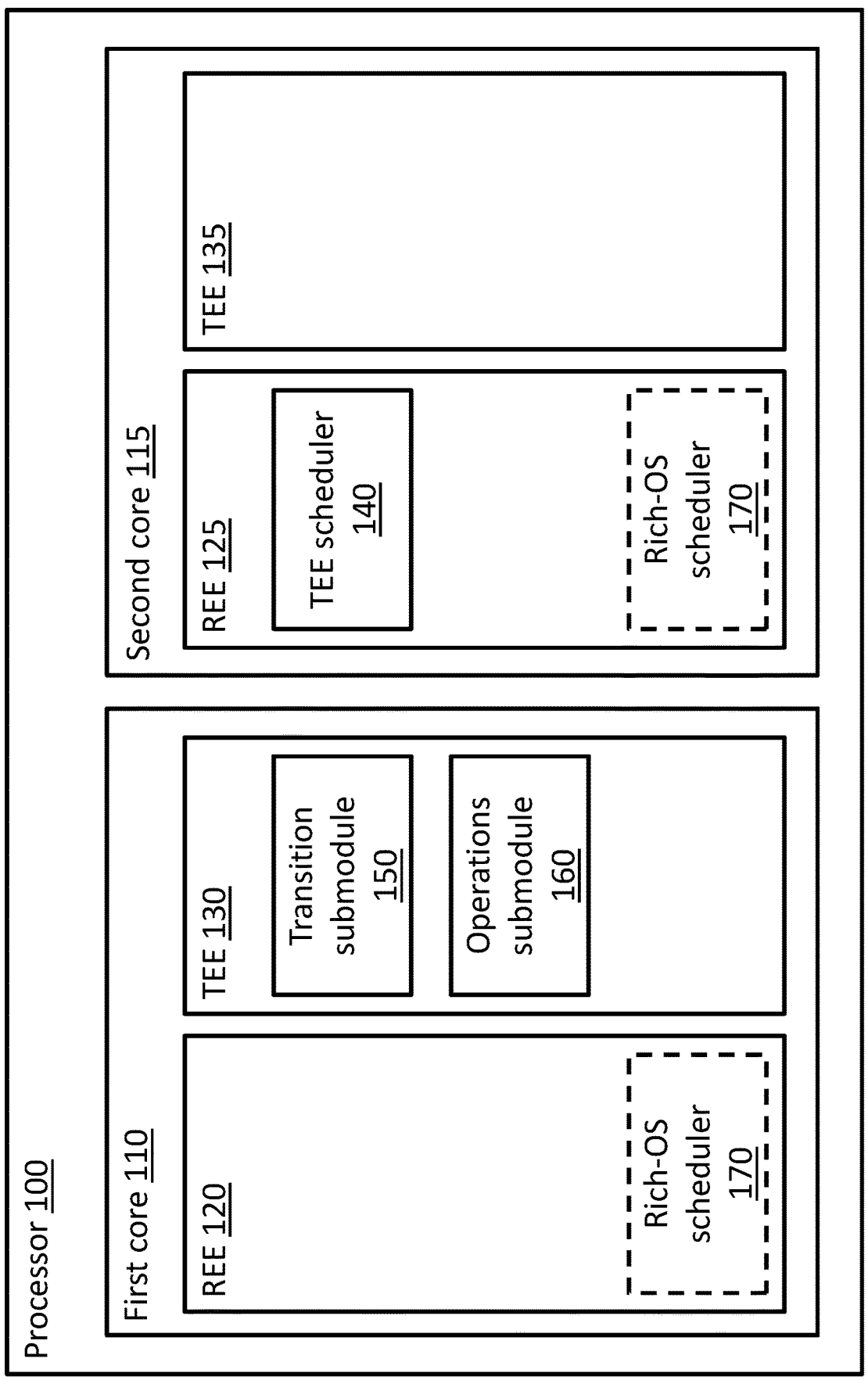
FIG. 1B schematically illustrates a multicore processor configured to operate after migration of the Trusted Execution Environment scheduler.
Figure 1C:
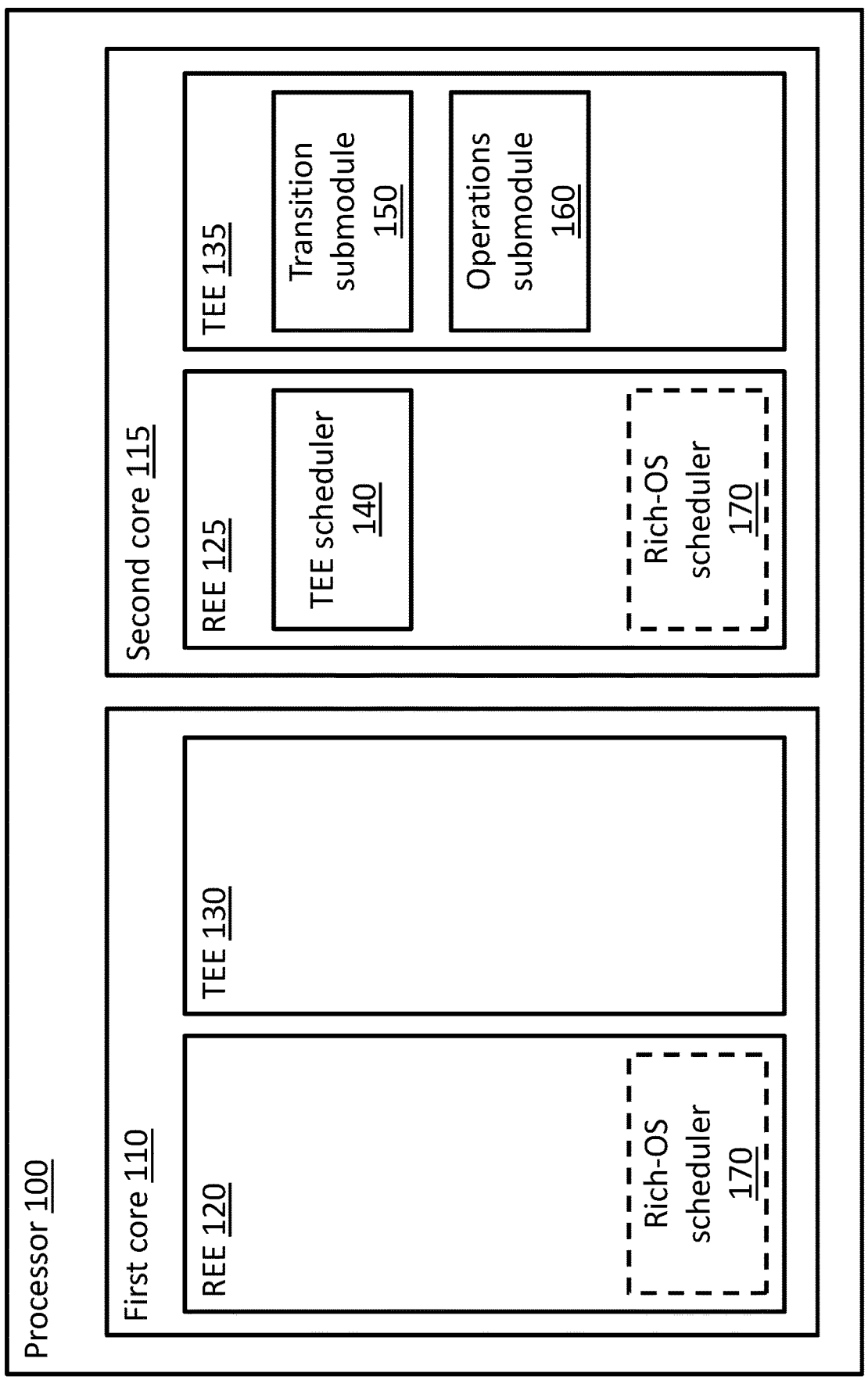
FIG. 1C schematically illustrates a multicore processor configured to operate after migration of the transition submodule and operations submodule.

FIGS. 1A, 1B and 1C show schematic illustrations of a multicore processor 100 configured to operate according to teachings of the disclosure. Each of FIGS. 1A, 1B and 1C depict a multicore processor comprising two cores: a first core 110; and a second core 115. While for clarity the figures have been depicted with only two cores it will be understood that the teachings contained herein apply to multicore processors with any plurality of cores. In some examples, the multicore processor 100 may have any of 2, 3, 4, 5, 6, 7, 8, 9 or 10 cores. In some examples, all cores have similar performance characteristics to each other. In other examples, the multicore processor 100 is a heterogeneous multicore processor where at least one of the cores of the heterogeneous multicore processor has different performance characteristics to another of the cores of the heterogeneous multicore processor. For example, the multicore processor 100 may have a first plurality of cores which are power-hungry but have relatively high computational performance and a second plurality of cores which are power efficient and have a relatively low computational performance. An example of a heterogeneous multicore processor architecture which can implement the present techniques is Arm® big.LITTLE™. Another example of such a suitable architecture is Arm® DynamIQ™.

As can be seen, each of the first core 110 and second core 115 have a normal area, REE 120 and REE 125 respectively, and a secure area, TEE 130 and TEE 135 respectively. The REEs 120, 125 are operable to run Rich Execution Environment applications, services and threads including a TEE scheduler 140 and a rich-OS scheduler 170. The TEEs 130, 135 are operable to run Trusted Execution Environment applications, services and threads including a transition submodule 150 and an Operations submodule 160.

The rich-OS scheduler 170 is depicted in each of FIGS. 1A, 1B and 1C with a dashed line in both the REE 120, 125 of the first core 110 and the second core 115. It will be appreciated that depending on the particular way the rich-OS is implementing the rich-OS scheduler 170, this scheduler may, for example, be exclusively operated in the REE 120 of the first core 110, be exclusively operated in the REE 125 of the second core 120, be dynamically migrated between the REEs 120, 125 of the two cores 110, 115, be operated in a multi-threaded state across both REEs 120, 125 of the two cores 110, 115 or any combination of the aforementioned possibilities.

FIG. 1A shows the multicore processor immediately before the TEE scheduler has been migrated. At this time, TEE scheduler 140 resides in REE 120 of the first core 110; and transition submodule 150 and operations submodule 160 reside in TEE 130 of the first core.

FIG. 1B shows the multicore processor some time later after the TEE scheduler 140 has been migrated to REE 125 of second core 115. In some examples, this migration is performed by the rich-OS scheduler, for example, in accordance with an optimization algorithm of the rich-OS scheduler. At this time, submodule 150 and operations submodule 160 remain in TEE 130 of the first core.

FIG. 1C shows the multicore processor some further time later after the TEE scheduler 140 issued a request (from its new location in REE 125 on core 115) to the transition submodule 150 to execute the operations submodule 160 which resulted in the execution of the transition submodule 150 and operations submodule 160 in TEE 135 on core 115. The migration process will now be described further with respect to FIG. 2.

Figure 2:
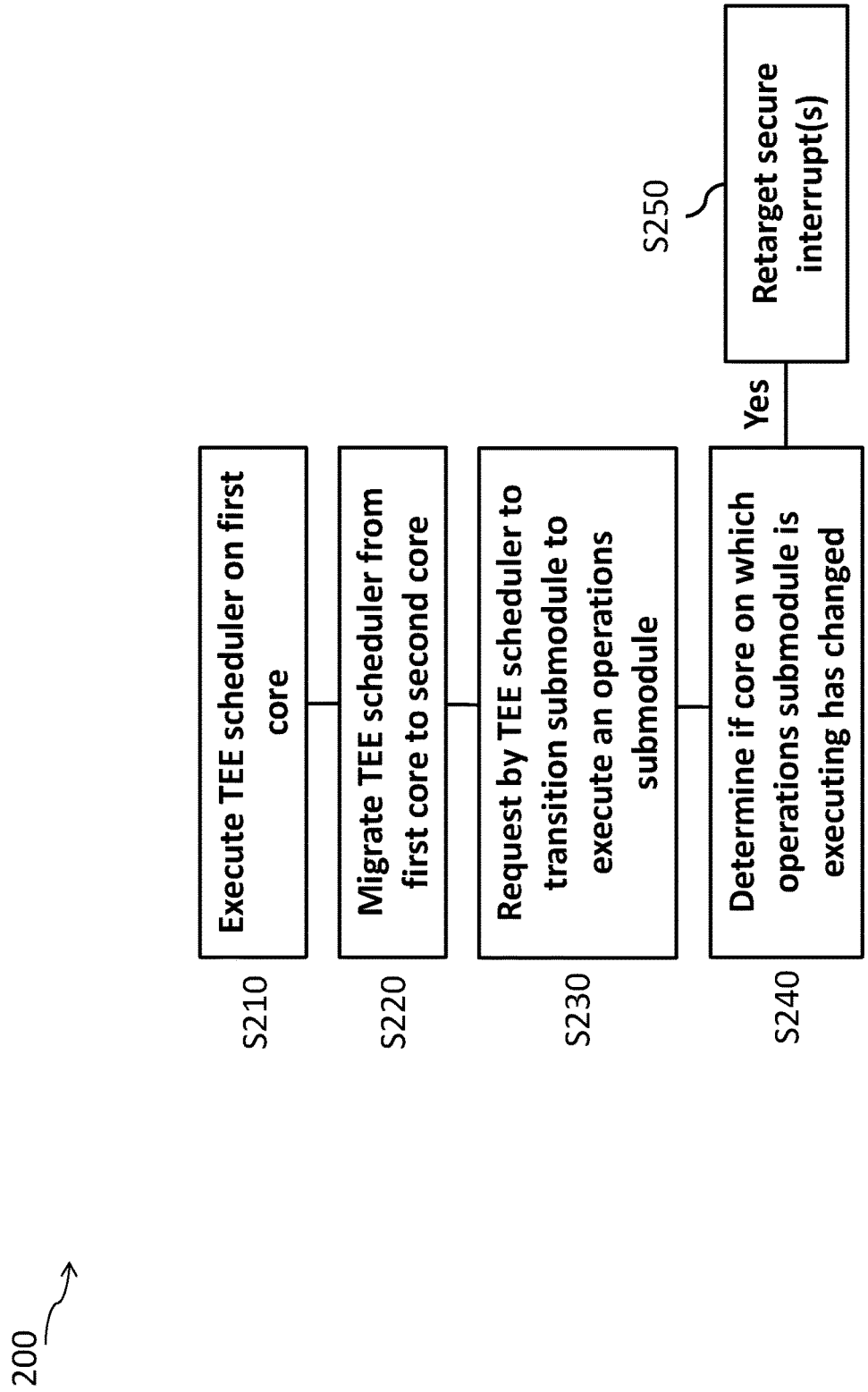
FIG. 2: Schematically illustrates a method of migrating execution of a Trusted Execution Environment from a first core to a second core.

FIG. 2 shows a schematic illustration of a method 200 of migrating execution of a Trusted Execution Environment from a first core to a second core according to teachings of the disclosure. It will be understood that the method can be applied to multicore processors of the type depicted in FIGS. 1A, 1B and 1C. The method includes the following steps.

At step S210, a TEE scheduler 140 is executed in the REE 120 on a first core 110 of the multicore processor 100. The method then continues to step S220.

At step S220, the TEE scheduler 140 is migrated from the first core 110 to the second core 115. The method then continues to step S230.

At step S230, subsequent to the migration of the TEE scheduler 140 from the first core 110 to the second core 115, the TEE scheduler 140 issues a request to the transition submodule 150 to execute an operations submodule 160 in the TEE 135. The transition submodule 150 is operable to manage the transition of the core of the processor between execution of the REE 125 and execution of the operations submodule 160 in the TEE 135. The transition submodule 150 is executed on the same core as the TEE scheduler 140. In the present example the operations submodule 160 is also executed on the same core as the TEE scheduler 140 although in other examples the operations submodule 160 may be executed on a different core determined by the transition submodule 150. The method then continues to step S240.

At step S240, a determination is made as to whether the core on which the operations submodule 160 is executing has changed since the previous execution of the operations submodule 160. In the present example, this determination is made by the operations submodule 160 itself, however, in other examples the determination is made by the transition submodule 150. In response to a positive determination that the core has changed (e.g. by comparing a currently active core identifier with a stored core identifier) then the method continues to step S250.

At step S250, responsive to a positive determination that the core which is executing the operations submodule 160 has changed, a number of secure interrupts are retargeted to target the current core on which the operations submodule 160 is executing on. In the present example, all programmed secure interrupts are retargeted to target the current core. In other examples, only a portion of the secure interrupts may be retargeted, for example, only one or more secure interrupts may be retargeted.

Figure 3:
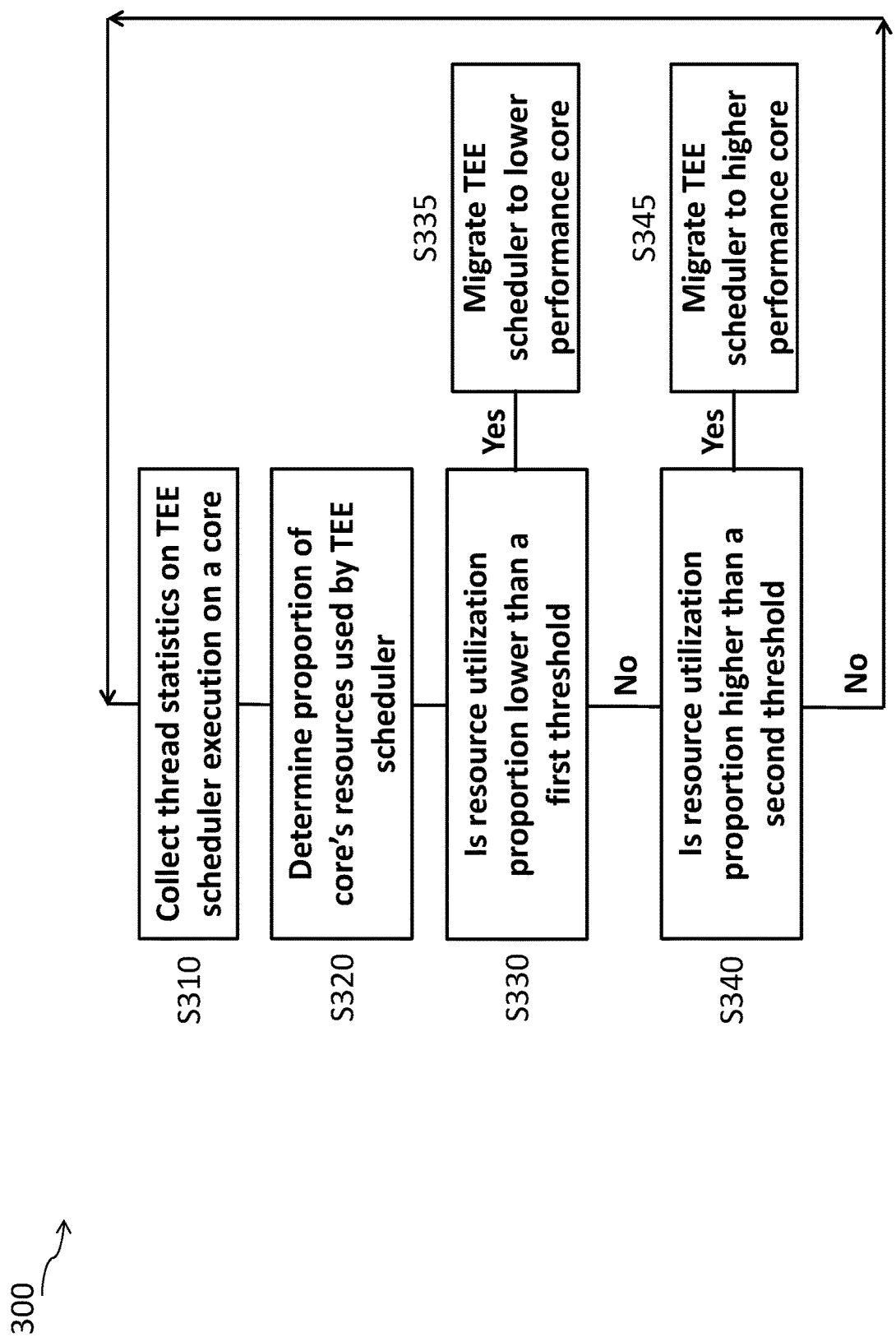
FIG. 3: Schematically illustrates a method of collecting and utilizing thread statistics using a rich-OS scheduler to migrate a Trusted Execution Environment to a lower or high performance core.

FIG. 3 shows a schematic illustration of a method 300 of collecting and utilizing thread statistics using a rich-OS scheduler to migrate a Trusted Execution Environment to a lower or high performance core according to teachings of the disclosure. It will be understood that the method can be applied to multicore processors of the type depicted in FIGS. 1A, 1B and 1C. It is furthermore understood the method 300 depicted in FIG. 3 may, in some examples, correspond to the migration step S220 in method 200 depicted in FIG. 2. The method includes the following steps.

At step S310, a rich-OS scheduler 170 collects thread statistics on the execution of the TEE scheduler 140, where the operations submodule 160 is executing on the same core that is executing the TEE scheduler 140, and where the execution of the operations submodule 160 is transparently extended through the TEE scheduler 140 (e.g. the operations submodule appears to be the same thread as the TEE scheduler to the REE and/or rich-OS scheduler) so that execution of the operations submodule 160 appears to be part of the TEE scheduler 140 to the rich-OS scheduler and accordingly execution of the operations submodule 160 is accounted for in the thread statistics of the execution of the TEE scheduler 140. The method then continues to step S320.

At step S320, the rich-OS scheduler 170 determines the proportion of resources used by the TEE scheduler 140 (including the embedded operations submodule 160 utilization), by means of the collected thread statistics, on the core on which the TEE scheduler 140/operations submodule 160 are executing. The method then continues to step S330.

At step S330, the rich-OS scheduler 170 checks if the TEE scheduler 140/operations submodule 160 resource utilization proportion on the core is lower than a first threshold value. In response to a positive determination the method continues to step S335. In response to a negative determination the method continues to step S340.

At step S335, responsive to the determination that the TEE scheduler 140/operations submodule 160 resource utilization proportion is lower than the first threshold value, the rich-OS scheduler 170 will migrate the TEE scheduler 140 to a lower performance core. In the present example, the migration of TEE scheduler 140 will result in the operations submodule 160 subsequently also being executed on the same new core since when the TEE scheduler 140 next requests execution of the operations submodule 160, via the transition submodule 150, both the transition submodule 150 and the operations submodule 160 will be executed on the same new core which the TEE scheduler 140 is executing on (e.g. via a SMC to a Secure Monitor of the transition submodule 150).

At step S340, responsive to the determination that the TEE scheduler 140/operations submodule 160 resource utilization proportion is higher than the first threshold value, the rich-OS scheduler 170 checks if the TEE scheduler 140/operations submodule 160 resource utilization proportion on the core is higher than a second threshold value. In response to a positive determination the method continues to step S345. In response to a negative determination the method returns to step S310 where a new round of collection of thread statistics and checking against thresholds is performed.

At step S345, responsive to the determination that the TEE scheduler 140/operations submodule 160 resource utilization proportion is higher than the second threshold value, the rich-OS scheduler 170 will migrate the TEE scheduler 140 to a higher performance core. In the present example, the migration of TEE scheduler 140 will result in the operations submodule 160 subsequently also being executed on the same new core since when the TEE scheduler 140 next requests execution of the operations submodule 160, via the transition submodule 150, both the transition submodule 150 and the operations submodule 160 will be executed on the same new core which the TEE scheduler 140 is executing on (e.g. via a SMC to a Secure monitor of the transition submodule 150).

It is to be understood that in some examples the difference in performance between cores may originate from differences in the hardware of the cores themselves, for example, in a heterogeneous multicore processor. In other examples, the difference in performance may arise from difference in the voltage, frequency or power state of the cores.

In some examples, rather than migrating the TEE scheduler 140 between cores the rich-OS scheduler 170 may instead adjusts the voltage, frequency or power state of the core on which it is executing to increase or decrease the performance of the core in response to resource utilization proportions on the core being determined to be exceeded or undershot.

It is to be understood that while in the present example the first and second threshold are depicted as static, in other examples these thresholds may be dynamically set by the rich-OS scheduler 170 to take into account, among other things, the resource utilization of other threads, the battery status of the device and/or the power/performance status of each of the plurality of cores.

Figure 4:
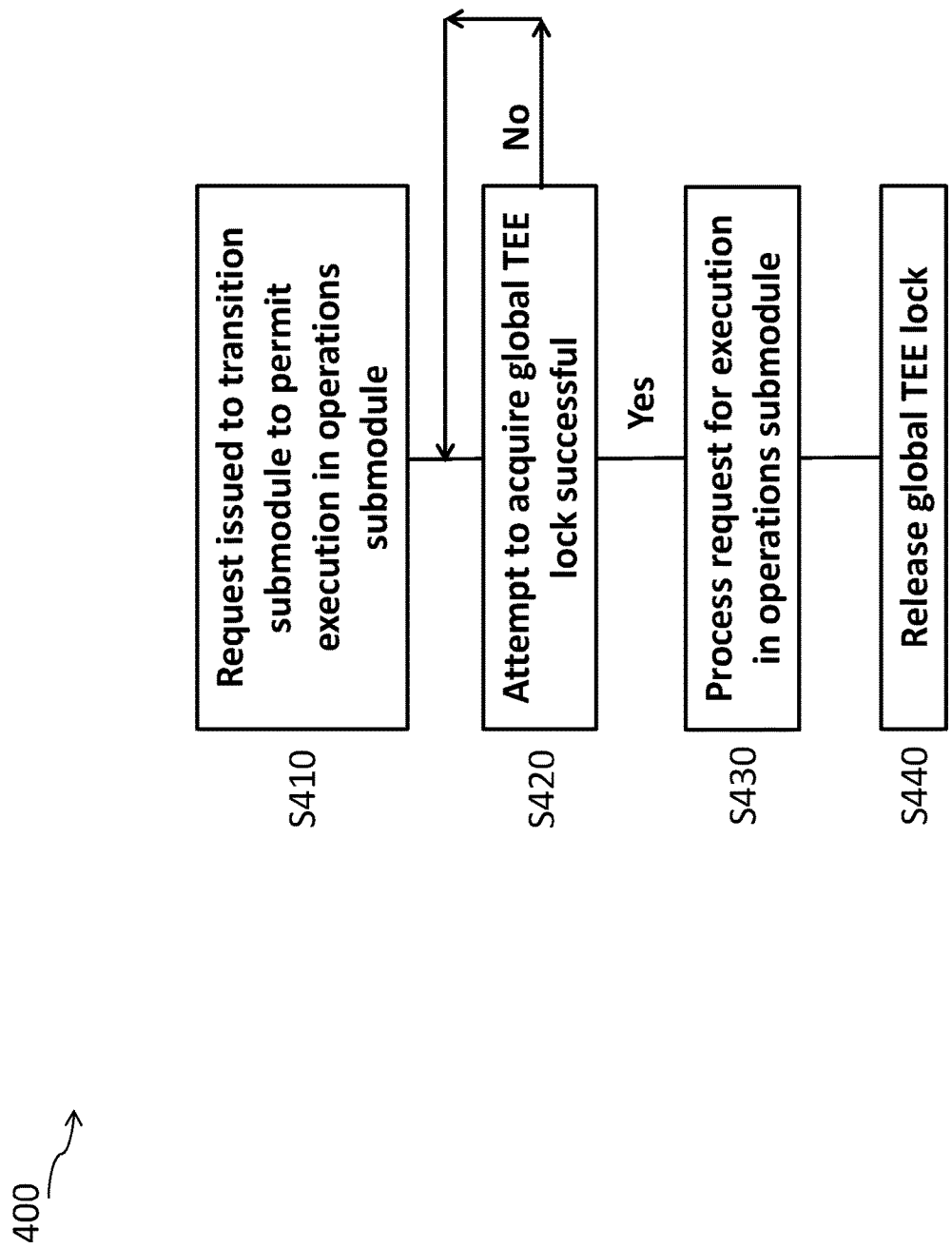
FIG. 4: Schematically illustrates a method of utilizing a global TEE lock to avoid various concurrency issues.

FIG. 4 shows a schematic illustration of a method 400 of utilizing a global TEE lock to avoid various concurrency issues according to teachings of the disclosure. It will be understood that the method can be applied to multicore processors of the type depicted in FIGS. 1A, 1B and 1C. It is furthermore understood the method 400 depicted in FIG. 4 may, in some examples, correspond to the migration step S230 in method 200 depicted in FIG. 2. The method includes the following steps.

At step S410, a request is issued to the transition submodule 150 to permit execution in the operations submodule 160. In some examples, the request corresponds to a request by the TEE scheduler 140 to execute the operations submodule and is issued to the transition submodule. In other examples, the request corresponds to a secure interrupt request being triggered while the core on which the secure interrupt request is triggered is executing in the REE. In either case the transition submodule 150 attempts to acquire a global TEE lock. The global TEE lock can be thought of, for example, as a flag which indicates if the operations submodule 160 is already executing. The method then continues to step S420.

At step S420, the transition submodule 150 checks to see if it has been able to successfully acquire the global TEE lock. If the attempt is unsuccessful the transition submodule periodically rechecks to see if it is able to acquire the global TEE lock. When the transition submodule is able to acquire the global TEE lock the method then proceeds to step S430.

At step S430, the transition submodule 150 permits execution of the operations submodule 160 and the request is processed in the operations submodule 160. The method then proceeds to step S440.

At step S440, once the request has been processed by the operations submodule 160 the global TEE lock is released. It is to be noted that, in some examples, the global TEE lock may be released before the entire request has been completely processed and the TEE scheduler 140 may schedule the operations submodule 160 to resume the computation at a later point in time. This may happen, for example, when a non-secure interrupt is triggered in the REE which necessitates pausing of the processing of the request in the operations submodule 160 in the TEE and return to execution of the REE.

In addition, each request does not necessarily need to separately acquire a global TEE lock. For example, where a secure interrupt request is triggered while the core on which the secure interrupt request is triggered is already executing in TEE, the secure interrupt request is immediately processed in the operations submodule 160 without the need for the global TEE lock to be reacquired.

Figure 5:
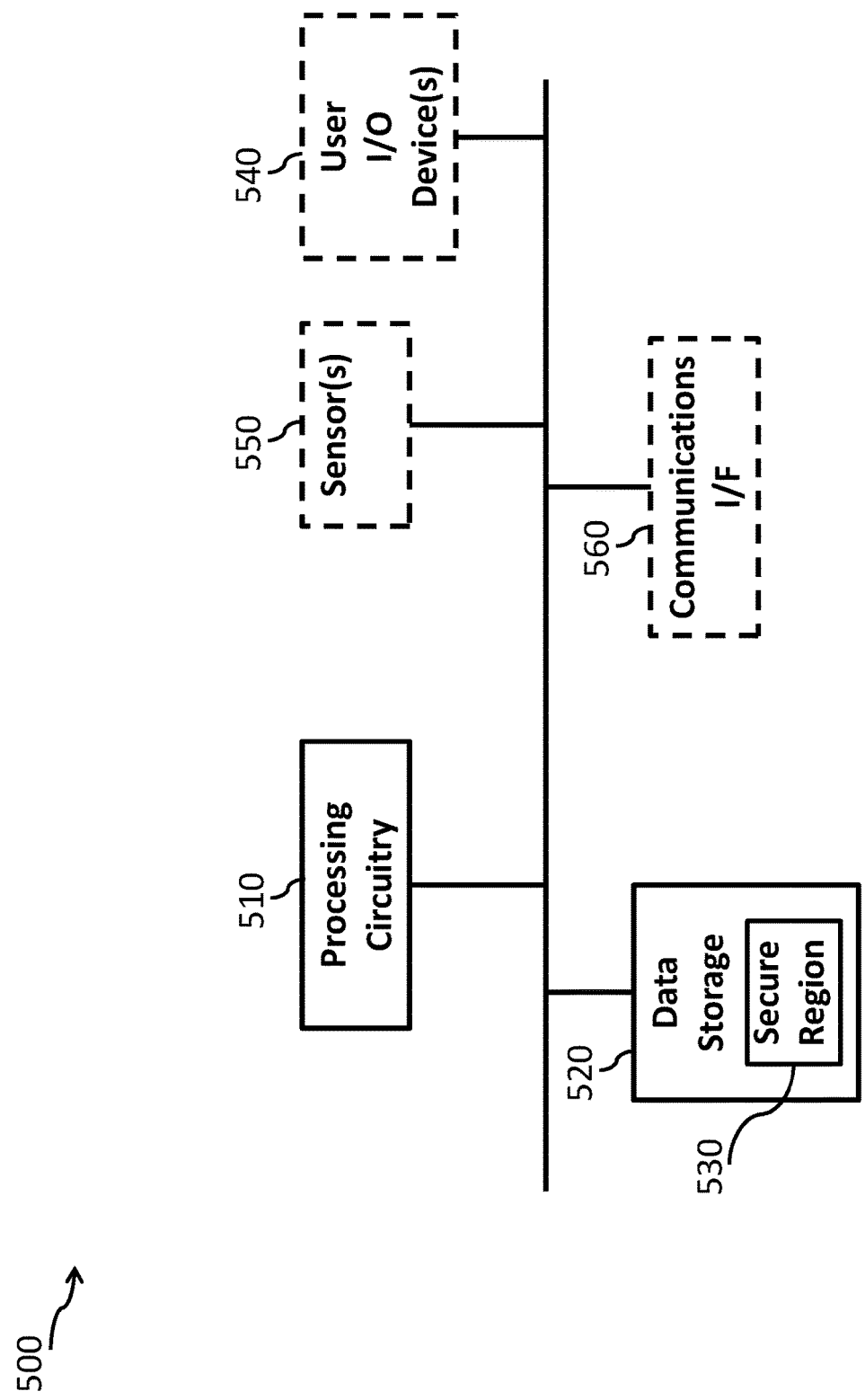
FIG. 5: Schematically illustrates an example of an electronic device which can be used to implement teachings of the disclosure.

FIG. 5 schematically illustrates an example of an electronic device 500 which can be used to implement any of the teachings described above including method 200, method 300 or method 400. The device has processing circuitry 510 for performing data processing in response to program instructions, data storage 520 for storing data and instructions to be processed by the processing circuitry 510. The processing circuitry 510 can correspond to the multicore processor 100 described above. In some examples, the processing circuitry 510 includes one or more caches for caching recent data or instructions. The data storage 520 may have a secure region 530 which is protected by hardware mechanisms (e.g. using memory protection units or security mechanisms providing a TEE) or by software mechanisms (e.g. encryption), so that data stored in a secure region 530 is inaccessible to software not executing within a trusted environment. The device 500 may have a communications interface 560 for communicating with external devices. For example communications interface 560 could use any other range of different communication protocols, such as Ethernet, WiFi®, Bluetooth®, ZigBee®, etc. The device may have one or more sensors 550 for sensing certain external conditions such as temperature, pressure, the proximity of a nearby user, etc. The specific sensors 550 provided may depend on the purpose of the device. It will be appreciated that FIG. 5 is merely an example of possible hardware that may be provided in the device and other components may also be provided. For example, some devices for which user interaction is expected may be provided with one or more user input/output device(s) 540 to receive input from a user or to output information to a user. In some examples, the one or more user input/output device(s) 540 can be used in conjunction with the operations submodule 160 to execute a trusted user interface that allows trusted applications operating in the TEE to securely receive inputs and send outputs from the one or more user input/output device(s) 540 bypassing the rich-OS operating in the REE. In some examples, the one or more user input/output device(s) 540 use secure interrupts to deliver user input to the trusted user interface and corresponding trusted application(s) being executed by the operations submodule 160 in the TEE. Other types of devices may simply be sensors which capture data and transmit the data to an external device and so these types of devices may not need a user interface or display.

The methods discussed above may be performed under control of a computer program executing on a device. Hence a computer program may comprise instructions for controlling a device to perform any of the methods discussed above. The program can be stored on a storage medium. The storage medium may be a non-transitory recording medium or a transitory signal medium.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative teachings of the disclosure have been described in detail herein with reference to the accompanying drawings, it is to be understood that the invention is not limited to those precise teachings, and that various changes and modifications can be effected therein by one skilled in the art without departing from the scope and spirit of the invention as defined by the appended claims.

The invention claimed is:

1. A trusted execution environment migration method for a device comprising a multicore processor, the processor operable to execute a rich execution environment (REE) and a trusted execution environment (TEE), the method comprising:
   executing a TEE scheduler in the REE on a first core of the multicore processor;
   subsequent to a migration of the TEE scheduler from the first core to a second core, issuing a request, by the TEE scheduler and to a transition submodule in the TEE, to execute an operations submodule in the TEE, wherein the transition submodule is operable to manage the transition of a core of the processor between execution of the REE and execution of the operations submodule in the TEE, and wherein the transition submodule is executed on the same core as the TEE scheduler;
   upon execution of the operations submodule, determining if the core on which the operations submodule is executing has changed since the previous execution of the operations submodule.

2. The method of claim 1, wherein if the core on which the operations submodule is executing has changed, one or more secure interrupts are retargeted to target the current core on which the operations submodule is executing.

3. The method of claim 1, wherein, if the core on which the operations submodule is executing has changed, all programmed secure interrupts are retargeted to target the current core on which the operations submodule is executing.

4. The method of claim 1, wherein the multicore processor is a heterogeneous multicore processor where at least one of the cores of the heterogeneous multicore processor has different performance characteristics to another one of the cores of the heterogeneous multicore processor.

5. The method of claim 1, wherein the TEE scheduler is migrated from the first core to the second core by a rich-OS scheduler executing in the REE.

6. The method of claim 5, wherein the rich-OS scheduler collects thread statistics on the execution of the TEE scheduler, wherein the operations submodule is executed on the same core that is executing the TEE scheduler, and wherein the execution of the operations submodule is transparently extended through the TEE scheduler so that execution of the operations submodule appears to be part of the TEE scheduler to the rich-OS scheduler and execution of the operations submodule is accounted for in the thread statistics of the execution of the TEE scheduler.

7. The method of claim 6, wherein in response to the rich-OS scheduler determining, using the thread statistics, that the TEE scheduler is utilizing a low or a high proportion of the resources of the core it is executing on, the rich-OS scheduler decreases or increases the voltage and/or frequency of the core the TEE scheduler is executing on respectively.

8. The method of claim 6, wherein the multicore processor is a heterogeneous multicore processor where at least one of the cores of the heterogeneous multicore processor has different performance characteristics to another one of the cores of the heterogeneous multicore processor,
   wherein in response to the rich-OS scheduler determining, using the thread statistics, that the TEE scheduler is utilizing a low or high proportion of the resources of the core it is executing on, the rich-OS scheduler migrates the TEE scheduler to a lower or higher performance core respectively.

9. The method of claim 1, wherein when a request by the TEE scheduler to execute the operations submodule is issued to the transition submodule, the transition submodule attempts to acquire a global TEE lock,
   if the global TEE lock is not already held then the attempt to acquire the global TEE lock is successful, the request is processed in the operations submodule and the global TEE lock is released once the request has been processed,
   if the global TEE lock is already held then the attempt to acquire the global TEE lock is unsuccessful and the request to execute the operations submodule is delayed until the global TEE lock can be acquired.

10. The method of claim 1, wherein when a secure interrupt request is triggered while the core on which the secure interrupt request is triggered is executing in the REE, the transition submodule attempts to acquire a global TEE lock,
   if the global TEE lock is not already held then the attempt to acquire the global TEE lock is successful, the secure interrupt request is processed in the operations submodule and the global TEE lock is released once the secure interrupt request has been processed,
   if the global TEE lock is already held then the attempt to acquire the global TEE lock is unsuccessful and the secure interrupt request is delayed until the global TEE lock can be acquired.

11. The method of claim 1, wherein when a secure interrupt request is triggered while the core on which the secure interrupt request is triggered is executing in the TEE, the secure interrupt request is immediately processed in the operations submodule.

12. The method of claim 1, wherein the TEE utilizes a microkernel.

13. The method of claim 1, wherein the multicore processor includes one or more caches for caching recent data or instructions.

14. The method of claim 1, wherein the operations submodule executes a trusted user interface and wherein one or more of the secure interrupts delivers user input to the trusted user interface.

15. At least one non-transitory, computer-readable medium storing a computer program to control a device to perform a trusted execution environment migration method for a device comprising a multicore processor, the processor operable to execute a rich execution environment (REE) and a trusted execution environment (TEE), the method comprising:

executing a TEE scheduler in the REE on a first core of the multicore processor;

subsequent to a migration of the TEE scheduler from the first core to a second core, issuing a request, by the TEE scheduler and to a transition submodule in the TEE, to execute an operations submodule in the TEE, wherein the transition submodule is operable to manage the transition of a core of the processor between execution of the REE and execution of the operations submodule in the TEE, and wherein the transition submodule is executed on the same core as the TEE scheduler;

upon execution of the operations submodule, determining if the core on which the operations submodule is executing has changed since previous execution of the operations submodule.

16. A device comprising:

a multicore processor operable to execute a rich execution environment (REE) and a trusted execution environment (TEE);

data storage storing at least one computer program for controlling a processing circuitry to perform a trusted execution environment migration method for a device comprising a multicore processor, the processor operable to execute a rich execution environment (REE) and a trusted execution environment (TEE), the method comprising:

executing a TEE scheduler in the REE on a first core of the multicore processor;

subsequent to a migration of the TEE scheduler from the first core to a second core, issuing a request, by the TEE scheduler and to a transition submodule in the TEE, to execute an operations submodule in the TEE, wherein the transition submodule is operable to manage the transition of a core of the processor between execution of the REE and execution of the operations submodule in the TEE, and wherein the transition submodule is executed on the same core as the TEE scheduler;

upon execution of the operations submodule, determining if the core on which the operations submodule is executing has changed since previous execution of the operations submodule.

\* \* \* \* \*